United States Patent [19]

McCulloch

[11] Patent Number: 4,715,448
[45] Date of Patent: Dec. 29, 1987

[54] FIRE EXTINGUISHER OUTLET HEAD

[76] Inventor: Alister L. McCulloch, 18 Berwick Brae Drive, Berwick, Victoria, Australia, 3806

[21] Appl. No.: 845,696
[22] PCT Filed: Jul. 15, 1985
[86] PCT No.: PCT/AU85/00153
   § 371 Date: Mar. 6, 1986
   § 102(e) Date: Mar. 6, 1986
[87] PCT Pub. No.: WO86/00969
   PCT Pub. Date: Feb. 13, 1986

[30] Foreign Application Priority Data
   Jul. 24, 1984 [AU] Australia .................. PG6189/85

[51] Int. Cl.$^4$ .................................... A62C 35/12
[52] U.S. Cl. ................................ 169/62; 169/19; 169/89; 220/261
[58] Field of Search ............ 169/19, 28, 62, 75, 169/89; 137/68.2; 220/261

[56] References Cited

U.S. PATENT DOCUMENTS

| | | |
|---|---|---|
| 2,336,942 | 12/1943 | Lindsay . |
| 2,353,765 | 7/1944 | Mathisen . |
| 2,399,553 | 4/1946 | Lindsay et al. . |
| 2,560,091 | 7/1951 | Davis . |
| 2,712,881 | 7/1955 | Mathisen ............... 169/28 X |
| 3,333,641 | 8/1967 | Hansom et al. ............ 169/28 X |
| 3,474,809 | 10/1969 | Gordon ................ 220/261 X |
| 4,003,395 | 1/1977 | Tyler . |
| 4,351,394 | 9/1982 | Enk . |

FOREIGN PATENT DOCUMENTS

| | | |
|---|---|---|
| 112426 | 2/1941 | Australia . |
| 56742 | 10/1980 | Australia . |
| 1133722 | 11/1968 | United Kingdom . |

Primary Examiner—Joseph F. Peters, Jr.
Assistant Examiner—Paul E. Salmon
Attorney, Agent, or Firm—Bacon & Thomas

[57] ABSTRACT

A fire extinguisher outlet head including a sealing plug having a head part that is sheared by an explosive charge upon actuation of the extinguisher head to permit release of extinguishant, whereby the sheared head part is guided along a curved path into an position in which it is retained so as not to impede discharge of the extinguishant through a discharge passage.

5 Claims, 8 Drawing Figures

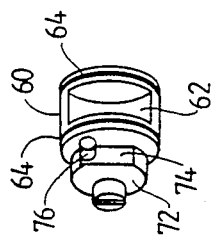
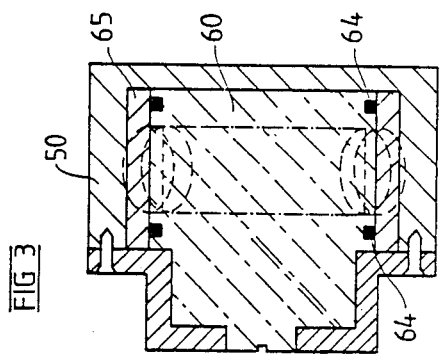
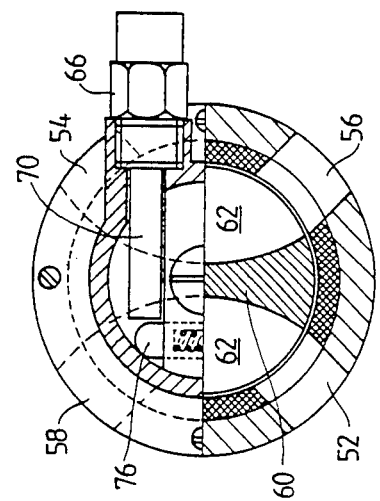
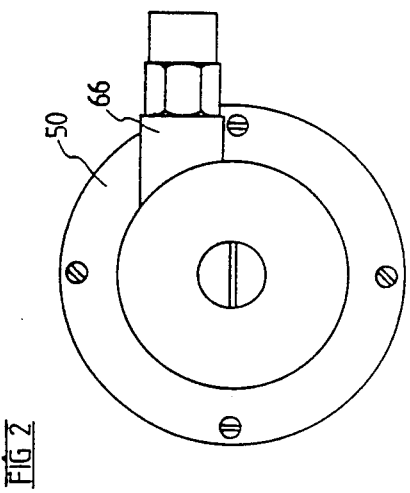
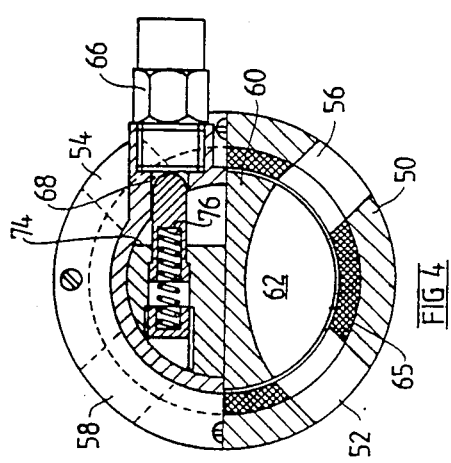

1

FIRE EXTINGUISHER OUTLET HEAD

The present invention relates to fire protection systems, and more particularly to a fire protection system for an aircraft.

There is disclosed in my earlier Australian patent No. 539,846 a fire protection system for two engines of an aircraft, comprising two fire extinguishers each having a single outlet head which leads, via a two position rotary distributor valve common to both extinguishers, to a respective one of the engines. In a first position of the valve, the extinguishant from the first extinguisher is directed to one of the engines and the extinguishant from the second extinguisher is directed to the second of the engines. If in the event of a fire in one of the engines, the extinguisher normally associated with that engine exhausts before the fire is extinguished, the rotary distributor valve can be switched to a second position in which extinguishant from the other extinguisher is directed to the fire. This previously proposed system is simpler and uses fewer components than conventional fire protection systems, while meeting CAA and FAA requirements. My previously proposed system thus permits important weight savings to be achieved.

The present invention concerns improvements to the extinguisher head and to the fluid distributor valve.

According to one aspect of the present invention there is provided a fluid distributor valve comprising a valve body having a plurality of inlet ports and a plurality of outlet ports, a valve member movable in the valve body between a first position in which the valve member provides discrete fluid communication between each respective inlet port and a respective one of the outlet ports and a second position in which the valve member provides discrete fluid communication between each respective inlet port and a different outlet port to that with which communication is provided in the first position, locking means for releasably locking the valve member in its first position, and explosive actuation means operative to effect release of said locking means and to displace the valve member from said first to said second position in which said valve member is locked against movement.

Preferably, the valve member is a rotary valve member with the first and second positions of the valve member being different angular positions, and the explosive actuation means comprises an explosively-driven pin which co-operates with the valve member when in its second angular position in order to lock the valve member in its second angular position.

According to another aspect of the invention, there is provided a fire extinguishing system for protecting two engines of an aircraft, said system comprising two fire extinguishers, each extinguisher having a single outlet head, explosive means associated with each said head for permitting discharge of extinguishant from the head, a distributor valve as above defined having only two inlet ports and only two outlet ports and a valve member rotatable between two positions, in a first of said positions the valve member connecting the first of said inlet ports with the first of said outlet ports and the second of said inlet ports with the second of said outlet ports, and in the second of said positions the valve member connecting the first of said inlet ports with the second of said outlet ports and the second of said inlet ports with the first of said outlet ports, a first conduit extending between the head of the first of said extinguishers and the first inlet port, a second conduit extending between the head of the second of said extinguishers and the second inlet port and a third conduit extending between the first outlet port and the first of said engines, a fourth conduit extending between the second outlet port and the second of said engines.

According to yet another aspect of the invention, there is provided an explosively actuated fire extinguisher outlet head comprising a housing having a passage adapted to communicate with extinguishant under pressure, said passage comprising a first passage portion and a second passage portion downstream of the first and extending transverse thereto, a charge plug sealing the first passage portion, said plug having a head adapted to be sheared off upon actuation of an explosive charge whereby to permit discharge of the extinguishant through the passage, the interior of the passage being shaped to guide the sheared head for movement under the pressure of the released extinguishant along a curved path away from the junction between the first and second passage portions to be retained in a position in which flow of extinguishant from said first to said second passage portion is substantially unimpaired by the sheared head.

According to yet another aspect of the invention, there is provided fire extinguishing system for protecting two engines of an aircraft, said system comprising two fire extinguishers, each extinguisher having a single outlet head, as above defined, explosive means associated with each said head for permitting discharge of extinguishant from the head, a distributor valve having only two inlet ports and only two outlet ports and a valve member rotatable between two positions, in a first of said positions the valve member connecting the first of said inlet ports with the first of said outlet ports and the second of said inlet ports with the second of said outlet ports, and in the second of said positions the valve member connecting the first of said inlet ports with the second of said outlet ports and the second of said inlet ports with the first of said outlet ports, a first conduit extending between the head of the first of said extinguishers and the first inlet port, a second conduit extending between the head of the second of said extinguishers and the second inlet port, a third conduit extending between the first outlet port and the first of said engines, a fourth conduit extending between the second outlet port and the second of said engines, and explosive means associated with the distributor valve and actuable to rotate the valve member from said first to said second position.

Embodiments of the invention will now be described, by way of example only, with reference to the accompanying drawings, in which:

FIG. 2 is a side elevation of a distributor valve in accordance with a preferred embodiment of the invention;

FIG. 3 is a section through the valve;

FIG. 4 is a section on line A—A of FIG. 3, a rotary valve member of the valve being shown in a normal position;

FIG. 5 is a section on line B—B of FIG. 3, with the rotary valve member being shown in its switched position;

FIG. 6 is a perspective view of the rotary valve member;

Figure 1:
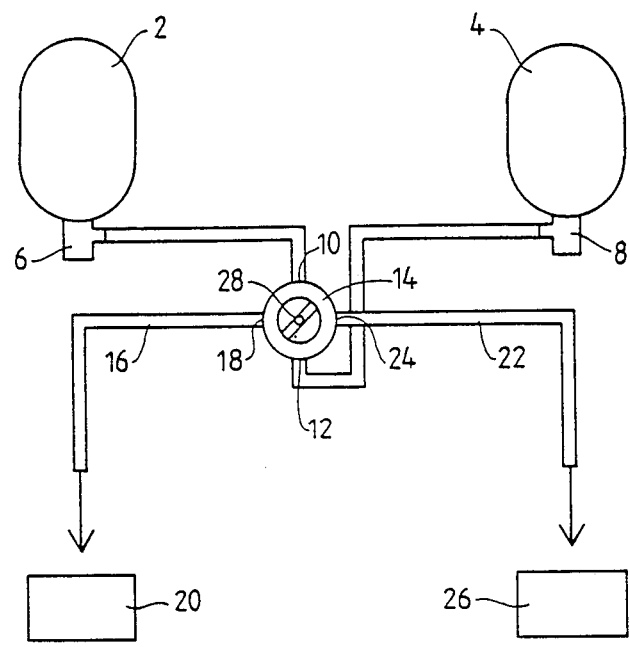
FIG. 1 shows schematically a fire protection system as disclosed in my earlier patent application.

There is shown in FIG. 1 the basic form of the fire protection system disclosed in my earlier patent application. The system comprises two fire extinguishers 2, 4 having discharge heads 6, 8, the heads 6, 8 being explosively actuated to permit discharge of extinguishant. Conduits from the heads 6, 8 lead to respective inlet ports 10, 12 of a rotary distributor valve 14. A conduit 16 extending from a first outlet port 18 of the valve leads to a first engine 20, and a conduit 22 extending from a second outlet port 24 leads to a second engine 26. In the normal condition of the valve 14 as shown in FIG. 1, a rotary valve member 28 communicates the inlet port 10 with the outlet port 18 (and thus the extinguisher 2 with the first engine 20), and the inlet port 12 with the outlet port 24 (and thus the extinguisher 4 with the second engine). In a switched condition of the distributor valve, the valve member is displaced through 90° from the position shown and thereby communicates the inlet port 10 with the outlet port 24 and thus with the second engine 26, and the inlet port 12 with the outlet port 18 and thus with the first engine 20.

An improved rotary distributor valve for the above system is shown in FIGS. 2 to 6. The valve comprises a body 50 having inlet ports 52, 54 and outlet ports 56, 58, with a rotary valve member 60 mounted for rotation within the body 50. In a normal position of the valve member 60 (see FIG. 4), the inlet ports 52, 54 are in communication with the outlet ports 56, 58, respectively, and in the switched position (see FIG. 5), the inlet ports 52, 54 are in communication with the outlet ports 58, 56 respectively. The rotary valve member 60 has the basic shape of a cylindrical body shaped to define two diametrically opposed channel-like curved passages 62 which provide the desired communication between the inlet and outlet ports. O-ring seals 64 on the periphery of the valve member 60 co-operate with a sealing lining 65 on the interior surface of the valve body 60 to seal the valve against leakage of extinguishant.

The valve member 60 is moved from its normal to its switched position by means of an explosively fired piston. The piston housing 66 is mounted on the valve body 50 and communicates with the interior of the valve body through a passage 68 which can be seen in FIG. 4. The piston itself can be seen in FIG. 5 designated 70, the piston in this Figure having been fired; in FIG. 4, the piston 70 is retracted within the housing 66.

The valve member 60 is shaped with an actuator portion in the form of a lobe 72 axially outwardly of the curved passages 62. One face 74 of the lobe 72 is planar and lies on a chordal plane of the basic cylindrical shape of the valve member, the chordal plane being transverse to, and preferably perpendicular to, the axis of the piston 70. The lobe 72 carries a plunger 76 which is spring-loaded to project outwardly from the planar face 74 substantially at right angles to that face. In the normal position of the valve member 60 as shown in FIG. 4, the outer end of the plunger 76 engages within the passage 68 leading from the piston housing 66 and thereby positively locks the valve member 60 in its normal position. This locking action has been found to be important because when either one of the extinguishers is first released the extinguishant pressure may reach 600 psi or more, and without a positive locking action there is a risk that the valve member 60 might turn and thereby prevent or impede discharge of extinguishant to the selected engine.

Upon explosive actuation of the piston 70 in order to switch the valve member, the end of the piston is projected through the passage 68 into the interior of the valve body, and in so doing displaces the spring-loaded plunger 76 out of the passage 68 thereby enabling the valve member 60 to turn, the thrust of the piston 70 on the plunger causing the desired turning movement. The valve member 60 turns through 90° into its switched position in which the planar face 74 of the lobe 72 lies against the longitudinal surface of the piston 70 as will be seen in FIG. 5, the piston 70, thereby positively locking the valve member 60 against movement when in its switched position.

It is to be noted that in order to effect virtually instantaneous and certain actuation of the extinguishers, the extinguisher heads are explosively actuated. In order to achieve virtually instantaneous switching of the distributor valve when the second of the two extinguishers is actuated if the first has failed to extinguish a fire, an explosively actuated switching mechanism is required, and the explosively actuated piston meets the necessary requirements for this.

The distributor valve may incorporate an electrical sensor (not shown) to indicate the position of the valve member.

Conventionally, explosively actuated extinguisher heads comprise a housing having a passage into which a charge plug is screwed or otherwise retained in order to prevent release of extinguishant under pressure within the extinguisher, suitable sealing means being provided between the charge plug and the housing. The charge plug is provided at its outer end with a weakened head which lies adjacent an explosive charge carried by the housing. Upon actuation of the charge, the head is sheared from the remainder of the plug body thereby permitting release of the extinguishant. Under the pressure of the extinguishant, the sheared head is driven along the passage into an end stop position in which it is held captive behind a retaining ring which prevents the plug from dropping back and blocking the passage. Discharge of the extinguishant occurs through an outlet port leading off a side of the passage between the end stop position of the sheared head and the remainder of the plug body.

In this known head, the passage is straight and the plug head moves substantially linearly along the passage into its captive stop position. As will be apparent, it is essential that the plug head does not twist within the passage and thereby become jammed within the passage before reaching its end stop position, as this could result in partial or complete blockage of the extinguishant flow. In order to prevent twisting of the plug head in the passage, the plug head is provided with a relatively large axial dimension, and this means that the passage in the housing must be of a sufficient length to accommodate the plug head in its end stop position. In turn, this means that the housing itself tends to be rather bulky, and thus relatively heavy.

For aircraft applications, even seemingly small weight savings provide significant attractions to aircraft manufacturers and operators, and the improved head now to be described is of a construction which permits a distinct weight reduction to be achieved.

Figure 7:
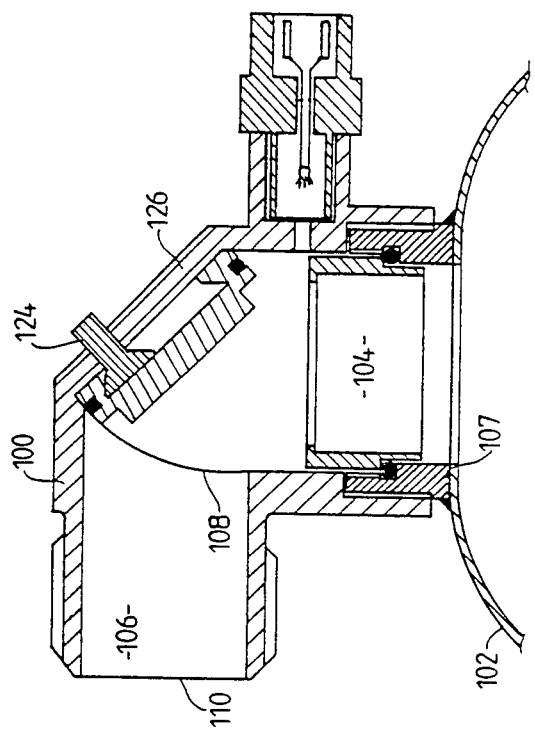
FIG. 7 is a section through explosively actuated extinguisher head in accordance with a preferred embodiment of the invention.
Figure 8:
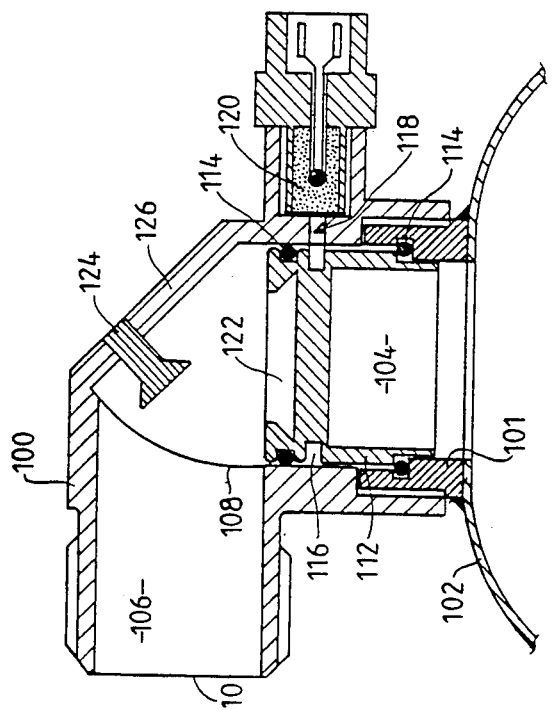
FIG. 8 is a section similar to FIG. 7 but showing the head after actuation.

The head shown in FIGS. 7 and 8 comprises a housing 100 which is screwed onto a boss 101 at the end of a fire extinguisher body 102. The housing 100 is shaped internally with a first passage portion 104 which is coaxial with the boss 101, and a second passage portion 106 at right angles to the first. A boundary surface 108 in the interior of the housing defining a transition between the two passage portions is smoothly curved to extend away from the outlet 110 of the second passage portion 106 for reasons which will be described shortly. In the embodiment shown, the surface 108 is of ellipsoidal form.

The first passage portion 104 is sealed relative to the interior of the extinguisher body 102 by a charge plug 112 screwed into the boss 101, O-ring seals being positioned between the charge plug 112 and the housing and boss, as shown at 114. The head of the charge plug 112 is weakened by means of a peripheral groove 116 which directly faces a flash hole 118 leading to an electrically-operated explosive charge 120 carried by the housing 100. The outer surface of the plug head is formed with an undercut recess 122 adapted to engage and to be retained by the head of pin 124 carried by the housing 100 in order to hold the plug head in an end stop position after shearing from the main body of the plug.

The pin 124 is carried by a wall 126 of the housing which faces the first passage portion 104 but which is inclined to the axes of the first and second passage portions 104 and 106 and faces the inlet to the first passage portion 104, and the outlet from the second passage portion 106. The inclined wall 126 starts at a position downstream of the charge plug 112, with the upstream edges of the inclined wall 126 and of the curved boundary surface 108 being substantially in a common plane at right angles to the axis of the first passage portion 104. The pin 124 is a friction fit within a bore in the inclined wall 126 and prior to activation of the extinguisher head, the pin projects by a substantial distance into the interior of the housing. Upon actuation of the extinguisher head, the explosive charge fires and shears the plug head radially in the zone of the groove 116. The sheared head is thrust by the pressure of extinguishant along the first passage portion until the head meets the beginning of the inclined wall at which point the plug head tilts towards the inclined wall 126, the opposite side of the plug head being guided towards the wall 124 by movement along the curved boundary surface 108. The outer surface of the plug head engages the pin head, and moves the pin 124 outwardly, the pin head latching within the recess 122 to hold the plug head in an end stop position in which it is parallel with, and against, the inclined wall 126 as shown in FIG. 8. In this condition, the end of the pin 124 projects outwardly from the housing to provide visible indication that the extinguisher has been fired.

The movement of the plug head into its end stop position is primarily a guided pivotal or tilting movement provided by co-operation between the plug head and the shaped interior surface of the passage within the housing. The thickness of the plug head necessary to ensure that this movement occurs without the plug head jamming or falling back is considerably less than that required to ensure linear movement into an end stop position and it is estimated that the plug head of the embodiment may be less than half of the thickness of plug heads used in conventional extinguisher heads. This, together with the different shape of housing, permits a significant reduction in the size and weight of the housing.

Although the extinguisher head shown in FIGS. 7 and 8 is primarily intended for use in the system as shown in FIG. 1, it will be appreciated that the head may be used in other fire extinguisher systems.

The embodiments have been described by way of example and modifications are possible within the scope of the invention.

I claim:

1. An explosively actuated fire extinguisher outlet head comprising a housing having a passage adapted to communicate with extinguishant under pressure, said passage comprising a first passage portion having an inlet and outlet, a second passage portion being downstream of the first and extending transverse thereto, and means defining a junction between said first and second passage portions, a charge plug sealing the first passage portion, said plug having a head adapted to be sheared off upon actuating of an explosive charge whereby to permit discharge of the extinguishant through the passage, the interior of the passage being shaped to guide the sheared head for movement under the pressure of the released extinguishant along a curved path away from the junction between the first and second passage portions to be retained in a position in which flow of extinguishant from said first to said second passage portion is substantially unimpaired by the sheared head, wherein the passage comprises a wall inclined to the axes of the first and second passage portions so as to face the outlet from the first passage portion and the inlet to the second passage portion, said outlet head further comprising retaining means for retaining the plug head against said inclined wall after shearing, said retaining means comprising a pin projecting transversely from said wall into the passage and having a head part shaped to engage and retain the sheared plug head, said pin being mounted in a bore extending through said wall for axial movement upon engagement by the sheared plug head whereby displacement of an outer end of the pin externally of said wall upon engagement of the plug head with the pin provides indication of actuation of the fire extinguisher outlet head.

2. An explosively actuated fire extinguisher outlet head comprising a housing having a passage adapted to communicate with extinguishant under pressure, said passage comprising a first passage portion and a second passage portion, the second passage portion being disposed downstream of the first passage portion and extending transversely with respect thereto, and means defining a junction between an outlet of said first passage portion and an inlet to said second passage portion, a charge plug sealing the first passage portion, said plug having a head adapted to be completely sheared off upon actuation of an explosive charge whereby to permit discharge of the extinguishant through the passage, the interior of the passage being provided with a curved boundary surface shaped to guide the sheared head for movement under the pressure of the released extinguishant along a corresponding curved path away from the junction between the first and second passage portions, said sheared head moving over an arc of substantially less than 90° to be retained in a position in which it faces the outlet of said first passage portion to permit substantially unimpaired flow of extinguishant from said first passage portion to said second passage portion.

3. A fire extinguisher outlet head according to claim 2, wherein the passage comprises a wall inclined to the axes of the first and second passage portions so as to face the outlet of the first passage portion, the plug head being retained in facing relationship to said inclined wall after shearing.

4. A fire extinguisher outlet head according to claim 3, further including means for positively retaining the plug head against said inclined wall.

5. A fire extinguisher outlet head according to claim 4, wherein the retaining means is movably mounted on the housing so as to be movable into a displaced position by the sheared plug head, said fire extinguisher outlet head further including indicator means viewable from outside the head to indicate movement of the retaining means into its displaced position consequent upon actuation of the fire extinguisher outlet head.

* * * * *